US006846688B2

(12) United States Patent
Nishiki et al.

(10) Patent No.: US 6,846,688 B2
(45) Date of Patent: Jan. 25, 2005

(54) METHOD OF MANUFACTURING A LIQUID CRYSTAL DISPLAY DEVICE WITH A MULTI-LAYER INTERLAYER INSULATOR

(75) Inventors: Hirohiko Nishiki, Nara (JP); James Mikel Atkinson, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 194 days.

(21) Appl. No.: 09/823,521

(22) Filed: Mar. 30, 2001

(65) Prior Publication Data

US 2002/0140889 A1 Oct. 3, 2002

(51) Int. Cl.$^7$ .............................................. H01L 21/84
(52) U.S. Cl. .......................... 438/30; 438/158; 438/609
(58) Field of Search .......................... 438/30, 158, 609, 438/950; 430/5, 320, 322

(56) References Cited

U.S. PATENT DOCUMENTS 6,624,085 B2 * 9/2003 Sandhu ....................... 438/736

* cited by examiner

Primary Examiner—Richard A. Booth
(74) Attorney, Agent, or Firm—Marger Johnson & McCollom PC

(57) ABSTRACT

A method of manufacturing a liquid crystal display (LCD) device and a novel LCD device structure are disclosed. In accordance with the preferred embodiment of the present invention, a photo-sensitive layer is formed over a substrate, followed by the formation of a photo-insensitive layer over the photo-sensitive layer. Then, a portion of the photo-sensitive layer is exposed via a photomask to a radiation source. Next, the portion of the photosensitive layer is contacted with a developing solution. At this time, the portion of the photo-sensitive layer is dissolved and the portion of the photo-insensitive layer overlying the portion of the photo-sensitive layer is removed concurrently. The present invention simplifies the LCD fabrication while decreasing the capacitance between a pixel electrode and bus lines.

34 Claims, 3 Drawing Sheets

After S/D Patterning

Coating process

Photo process

Develop
(Remove by
developer)

Cure
Pixel
electrode
formation
process

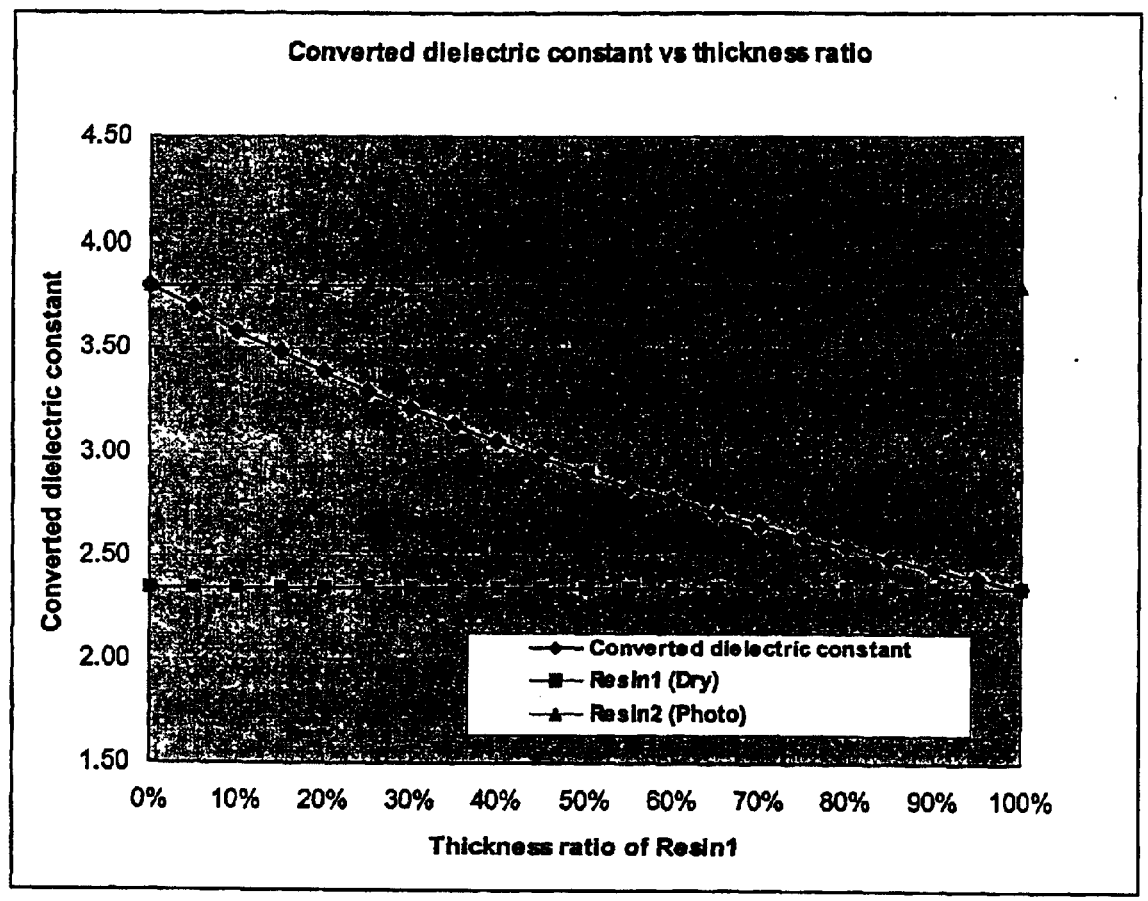
FIG. 2  Converted dielectric constant vs thickness ratio

METHOD OF MANUFACTURING A LIQUID CRYSTAL DISPLAY DEVICE WITH A MULTI-LAYER INTERLAYER INSULATOR

BACKGROUND OF THE INVENTION

1. The Field of the Invention

This invention relates generally to the field of liquid crystal displays (LCD), and more particularly, to a novel LCD device structure and a method of manufacturing the same.

2. Description of the Related Art

An LCD device is indispensable for manufacturing notebook-type personal computers because they are much lighter and thinner than cathode-ray tube (CRT) monitors. In addition, the energy consumption of the LCD device is much lower than that of the CRT monitor.

However, the image quality of the LCD device is normally not as good as that of the CRT monitor. To improve the image quality and to decrease energy consumption, the aperture ratio (the ratio of pixel area to total display area) of the LCD device must be increased as much as possible.

Responding to these needs, a Pixel-on-Passivation (POP) structure is recently employed for a thin-film-transistor liquid-crystal-display (TFT-LCD) device to increase the aperture ratio. In the POP structure, a capacitance between a pixel electrode and bus lines must be kept sufficiently low such that the image quality is not degraded by the signal delay. In order to decrease the capacitance, the dielectric constant of an interlayer insulator between the bus lines and the pixel electrode must be low.

To form an interlayer insulator for the POP structure, several insulating materials such as photo-sensitive resins and dry-etch type resins can be used.

The photo-sensitive resins are widely used because they can be easily patterned using a conventional photolithographic process. However, the dielectric constants of photo-sensitive resins are typically high ($\epsilon$~3.8) and are thus not suitable for manufacturing a high-quality LCD device.

In contrast, dry-etch type resins generally have lower dielectric constant and higher transparency. However, the dry-etch type resins are normally photo-insensitive. Therefore, to pattern the dry-etch type resins, a conventional photoresist has to be coated over the dry-etch type resins for photolithographic process steps. A stripping process is then used to remove the photoresist after patterning the dry-etch type resins.

However, an organic stripper that is typically used for the stripping process can severely damage the dry-etch type resins. In addition, some dry-etch type resins have other problems. For example, perfluorocyclobutane (PFCB), developed by Dow chemical, although having very low dielectric constant ($\epsilon$~2.35), its adhesion to typical inorganic films, $SiN_x$, TaN or indium tin oxide (ITO), is too poor for proper fabrication of the LCD device. Also, Organic Spin-on-glass (SOG), also having very low dielectric constant ($\epsilon$~2.3), tends to have many cracks in a layer of the SOG if its thickness exceeds approximately 1 $\mu$m. Also, another problem of the dry-etch type resins is that normally they are much more expensive than typical photo-sensitive resins.

For these reasons, the photo-sensitive resins are still used for manufacturing the LCD device even though the photo-sensitive resins have low dielectric constant that is not good for achieving a high-quality LCD device.

Accordingly, there is a need to develop a method of manufacturing high-resolution LCD devices overcoming the drawbacks of conventional materials. Also, there is a need to develop a method of manufacturing LCD devices with fewer or simplified process steps.

SUMMARY OF THE INVENTION

A method of manufacturing a novel liquid crystal display (LCD) device and the novel LCD device structure are disclosed. In accordance with the preferred embodiment of the present invention, a photo-sensitive layer is formed over a substrate, followed by the formation of a photo-insensitive layer over the photo-sensitive layer. Then, a portion of the photo-sensitive layer is exposed via a photo-mask to a radiation source. Next, the portion of the photosensitive layer is contacted with a developing solution.

The present invention has advantages such as simplifying the LCD fabrication while lowering parasitic capacitance between a pixel electrode and bus lines, thereby improving the image quality of the LCD device.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 2 is a graph to show the ratio of converted dielectric constant versus the thicknesses of a photo-insensitive layer and a photo-sensitive layer in accordance with preferred embodiments of the present invention.

DETAILED DESCRIPTION

A method of manufacturing a novel LCD device and the novel LCD device structure are disclosed. In the following description, numerous specific details are set forth to provide a thorough understanding of the present invention. However, one having ordinary skill in the art should recognize that the invention can be practiced without these specific details. In some instances, well-known process steps, device structures, and techniques have not been shown in detail to avoid obscuring the present invention.

As described above, conventionally, to pattern the dry-etch type resins, a photoresist pattern has been required. These additional steps to remove such a photoresist pattern after the patterning of the dry-etch type resins add complexity and cost to the fabrication process.

Thus, the present invention contemplates, among others, an improved method for forming a patterned interlayer insulator (passivation layer) for a POP structure of a high-quality LCD device without using the photoresist and the stripping process. In the POP structure of the preferred embodiments of the present invention, a multi-layer interlayer insulator is formed between the pixel electrode and bus lines to reduce parasitic capacitance thereof. The preferred embodiments of the present invention also contemplates, among other things, reducing the process steps while using conventional materials such as inexpensive photo-sensitive resins.

FIGS. 1A–1E are sectional views illustrating a manufacturing process for fabricating a LCD device according to the preferred embodiment of the present invention. Details of the manufacturing steps are omitted if they are conventional or well known for clarity and simplicity.

Figure 1A:
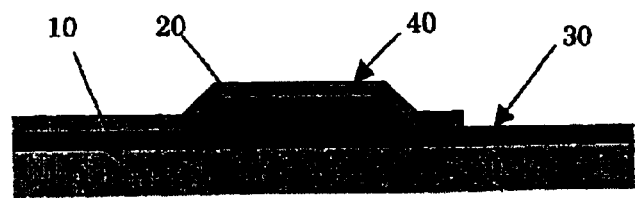
FIGS. 1A through 1E are sectional views illustrating a manufacturing process for fabricating a LCD device according to preferred embodiments of the present invention.

As shown in FIG. 1A, to manufacture a LCD device, a substrate 10 formed of a material such as glass or any other suitable transparent material is provided with source and drain regions (not shown). The substrate 10 has a gate bus line 20, covered with a gate insulator 30. A drain electrode 40 is formed over the gate insulator 30.

Figure 1B:

Referring to FIG. 1B, a photo-sensitive layer 90 is coated or formed over the substrate 10 of FIG. 1A, using conventional techniques such as spin coating. The thickness of the photo-sensitive layer is preferably between approximately 0.1 and 8 μm. More preferably, the photo-sensitive layer is formed of photo-sensitive resin such as photo-sensitive acrylic resin, photo-sensitive benzocyclobutene (BCB), photo-sensitive PFCB, or photo-sensitive polyimide. Here, the photo-sensitive layer 90 is of a positive type such that any portion of the photo-sensitive layer 90 that is exposed to ultraviolet light or other radiation source can be removed by a subsequent developing process.

Next, a photo-insensitive layer 50 is coated or formed over the photo-sensitive layer 90, using conventional techniques such as spin coating. The thickness of the photo-insensitive layer 90 is preferably between approximately 0.1 and 8 μm. Preferably, the photo-insensitive layer is formed of photo-insensitive resin such as photo-insensitive PFCB, photo-insensitive BCB, photo-insensitive polyimide or photo-insensitive SOG. However, those of skill in the art will appreciate that the above lists are not exhaustive or exclusive and are not intended to limit in any way the scope of the invention as claimed. Instead, any other photo-sensitive materials or photo-insensitive materials suitable for the purpose of the present invention can be used.

Figure 1C:
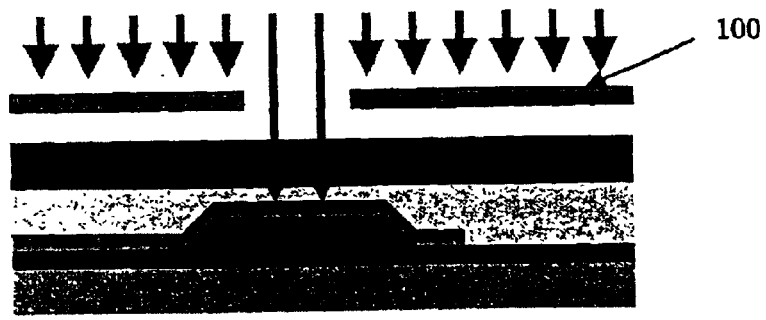

Turning to FIG. 1C, a portion of the photo-sensitive layer 90 is exposed via a photo-mask 100 to a radiation source for performing a photolithographic process. The exposure is for a predetermined time period, for example, approximately less than 10 seconds. The radiation source can be electron beam radiation, x-ray radiation, ultraviolet radiation or any other suitable sources.

Figure 1D:
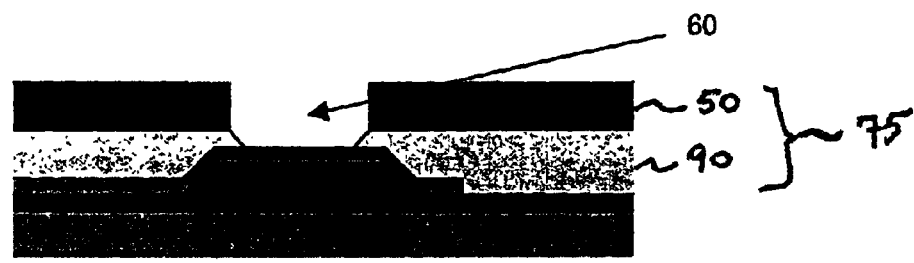

Referring to FIG. 1D, the exposed portion of the photo-sensitive layer 90 is then contacted with a developing solution using conventional techniques such as immersion, spray, or puddle. The developing solution preferably comprises an alkaline solution. More preferably, the alkaline solution comprises Tetramethylammonium hydroxide (TMAH). The TMAH has been shown to minimally damage the resins.

The photo-insensitive layer 50 is preferably formed of an organic material having numerous very small openings such that the molecules of the developing solution, which are relatively smaller than the molecular size of the material that forms the photo-insensitive layer 50, penetrates the photo-insensitive layer 50. The photo-insensitive layer 50 is thus permeable to the developing solution. It is believed that once the developing solution reaches the underlying photo-sensitive layer 90 through the photo-insensitive layer 50, the adhesion between the photo-insensitive layer 50 and the photo-sensitive layer 90 become weaker, making it easier for the developing solution to reach the other portions of the underlying photo-sensitive layer 90. As a result, the exposed portion of the photo-sensitive layer 90 is dissolved and the portion of the photo-insensitive layer 50 overlying the exposed portion of the photo-sensitive layer 90 is removed together. ("Resin Lift-off Process") These steps consequently form a through hole 60 in a multi-layer interlayer insulator 75 comprising the photo-sensitive layer 90 and the photo-insensitive layer 50.

In one embodiment of the present invention, the step of forming the photo-insensitive layer 50 over the photo-sensitive layer 90 sequential or consecutive without any treatment on the photo-sensitive layer 90.

In contrast, in a conventional lift-off process, a patterned photoresist must be initially formed by coating, exposure, development and curing. Then, a photo-insensitive type layer is applied thereon. If dry-etch type resins are used as the photo-insensitive type layer, the dry-etch type resins must be cured before performing a subsequent stripping process so as to reduce the damage during the stripping process. After the curing, the dry-etch type resins and the underlying photoresist are removed (lift-off) by an organic stripper, which severely damages the dry-etch type resins. Severe curing may be performed to reduce the damage. Unfortunately, such severe curing makes the removal of the photoresist more difficult.

According to the preferred embodiments of the present invention, however, the photo-sensitive layer 90, formed of a material such as a photo-sensitive resin instead of a photoresist, is initially formed. Then, without patterning the photo-sensitive layer 90 unlike the conventional lift-off process, the photo-insensitive layer 50 is formed over the photo-sensitive layer 90. Then, the photo-sensitive layer 90 is patterned, using a developing solution as described above. This is possible because a radiation such as ultraviolet (UV) light and, as stated above, the developing solution can penetrate the overlying photo-insensitive layer 50 and reach the underlying photo-sensitive layer 50. In short, according to the preferred embodiments of the present invention, after the layers 50 and 90 are consecutively coated over the substrate 10, both layers 50 and 90 are exposed and subsequently patterned by a developing solution, not by a stripper. Because the developing solution does not damage the photo-insensitive layer in the present invention Resin Lift-off process, the image quality of the LCD device can be improved with less damage to the interlayer insulator (passivation layer).

Thus, in accordance with the present invention, process steps can be reduced and can be made simpler without using the damaging stripper compared to the conventional lift-off process. This is particularly true because during the developing process, not only the portion of the underlying photo-sensitive layer 90 is dissolved but also the portion of the underlying photo-insensitive layer is removed together and thus all the steps to form and remove the photoresist pattern using the stripper can be omitted.

Subsequently, the resulting structure is rinsed with a liquid such as water. And the photo-insensitive layer 50 and the photo-sensitive layer 90 are cured, preferably, at the same time. Next, a transparent electrode layer 70 such as an indium tin oxide (ITO) layer is formed overlying the resulting structure including the through hole 60. The transparent electrode layer 70 is electrically connected to the drain electrode 40 via through hole 60. As a result, a POP structure is completed in accordance with the preferred embodiments of the present invention.

In the prior art LCD device without the POP structure, because a pixel electrode is formed on the same level as bus lines and a drain electrode, a gap was required between the pixel electrode and the bus lines such that the pixel electrode is placed between the bus lines without electrical short. Thus, the aperture ratio was low. If the LCD device is fabricated with the POP structure, an interlayer insulator (passivation layer) can be disposed between the pixel electrode layer and source/drain regions. Thus, the pixel electrode layer can be overlapped with the bus lines, thereby achieving larger pixels with brighter display (high aperture ratio).

However, even with this POP structure, the parasitic capacitance may increase due to overlapping of the pixel on the bus lines, which degrades the image quality of the LCD device. Thus, in order to lower the parasitic capacitance, it is preferred that the interlayer insulator (passivation layer) be formed of a material having low dielectric constant (low-k material). In addition, the image quality of the LCD device can be improved by increasing the thickness of the interlayer insulator. Thus, if the photo-insensitive layer is formed thick, productivity and the performance of the LCD device can be improved.

Figure 1E:
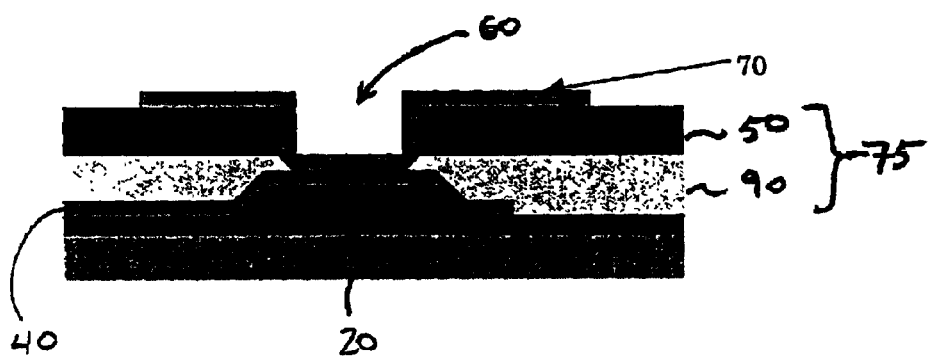

In response to these requirements, the preferred embodiments of the present invention includes the multi-layer interlayer insulator 75 comprising the photo-insensitive layer 50 and the photo-sensitive layer 90 disposed between the pixel electrode layer 70 and the drain electrode 40 as illustrated in FIG. 1E.

Importantly, the present invention has advantages in that the dry-etch type resins having lower dielectric constant can be combined with conventional photo-sensitive resins to form a multi-layer interlayer insulator (passivation layer) for the POP structure. Thus, the effective dielectric constant of the interlayer insulator can be reduced without an increase of the total process steps.

The total combined capacitance can be calculated from individual capacitances. Therefore, if the passivation layer-double layer resins are regarded as a single layer resin, the converted dielectric constant can be expressed as follows.

$$\epsilon = \epsilon_1 * \epsilon_2 / \{(1-a) * \epsilon_1 + a * \epsilon_2\}$$

$\epsilon$: converted dielectric constant $\epsilon_1$: dielectric constant of photo-insensitive layer 50

$\epsilon_2$: dielectric constant of photo-sensitive layer 90 a: thickness ratio of photo-insensitive layer 50 to total thickness (a thickness of the photo-insensitive layer 50 plus a thickness of the photo-sensitive layer 90)

As shown in FIG. 2, the converted dielectric constant is calculated based on the following assumption.

$$\epsilon_1 = 2.35, \epsilon_2 = 3.80$$

Here, the converted dielectric constant decreases with an increasing thickness ratio. For example, if the thickness ratio is 0.5, the converted dielectric constant is 2.90. However, the Resin lift-off process according to the preferred embodiments of the present invention may become unstable as the thickness ratio increases too high. Thus, preferably, the thickness ratio of the photo-insensitive layers to the total thickness is preferably not more than approximately 50%. For example, the photo-sensitive layer 90 may have a thickness of approximately 1.5 μm and photo-insensitive layer 50 may have a thickness of approximately 1.5 μm. In this case, the present invention Resin lift-off process can be performed easily or with a short process time compared to a case where the thickness of the overlying photo-insensitive layer is too thick to remove.

However, the present invention is not limited to these thickness ranges. A person skilled in the art will appreciate that the optimum thickness ratio may be dependent on the materials being used and the process employed depending on specific applications.

There are some additional advantages in the Resin Lift-off process in accordance with the preferred embodiments of the present invention. For example, the adhesion of PFCB to inorganic films is too poor to be used for manufacturing a LCD device. However, in the Resin Lift-off process of the preferred embodiments of the present invention, photo-insensitive PFCB is cured with the underlying photo-sensitive resin, thus the adhesion of the photo-insensitive PFCB to the underlying photo-sensitive resin can be made strong enough for manufacturing a LCD device. In the case of organic SOG, the film thickness is limited due to cracks formed in the resin. However, in the Resin Lift-off process of the preferred embodiments of the present invention, the total thickness can be optimized by changing the thickness of the photo-sensitive resin.

In addition, in the Resin Lift-off process according to the preferred embodiment of the present invention, the converted dielectric constant decreases and the material cost increases with the increasing thickness ratio. Therefore, the thickness ratio can be optimized from the viewpoint of not only process, but also cost performance. Consequently, the panel quality corresponding to the material cost can be easily adjusted. In other words, by controlling the thickness of the photo-sensitive layer and the photo-insensitive layer, productivity and the performance of the LCD device can be optimized depending on applications.

Based on these observations, according to the preferred embodiments of the present invention, the dielectric constant of the photo-sensitive layer 90 may be between approximately 2.5 and 4.0. And the dielectric constant of the photo-insensitive layer 50 may be between approximately 1.5 and 3.5. More preferably, the combined dielectric constant of the photo-sensitive layer and the photo-insensitive layer is between approximately 1.5 and 3.5.

Thus, the present invention provides an improved method for forming a patterned insulator (passivation layer) for a POP structure of a high-quality LCD device without using the photoresist and the stripping process. According to the preferred embodiments of the present invention, a multi-layer interlayer including a low-k material such as dry-etch type resins is formed between the pixel electrode and bus lines to thereby reduce parasitic capacitance thereof. The preferred embodiments of the present invention also have other advantages such as reducing the process steps while using conventional materials such as inexpensive photo-sensitive resins. Additionally, in the present invention, by controlling the thickness of the photo-sensitive layer and the photo-insensitive layer, productivity and the performance of the LCD device can be optimized depending on applications. Also, photo-insensitive resins such as photo-insensitive PFCB can be cured together with the underlying photo-sensitive resins, thus the adhesion of the photo-insensitive resins to the underlying photo-sensitive resins can be made strong for manufacturing a LCD device.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A method of manufacturing a liquid crystal display (LCD) device, comprising:

forming a photo-sensitive layer over a substrate;

forming a photo-insensitive layer over the photo-sensitive layer;

exposing a portion of the photo-sensitive layer to a radiation source through the photo-insensitive layer via a photo-mask; and contacting the portion of the photo-sensitive layer using a developing solution.

2. The method of claim 1, wherein said contacting dissolves the portion of the photo-sensitive layer and removes the portion of the photo-insensitive layer overlying the portion of the photo-sensitive layer together.

3. The method of claim 1, wherein the photo-insensitive layer is formed of photo-insensitive resin.

4. The method of claim 3, wherein the photo-insensitive resin is selected from the group consisting of photo-insensitive PFCB, photo-insensitive BCB, photo-insensitive polyimide and photo-insensitive SOG.

5. The method of claim 1, wherein the radiation source is electron beam radiation, x-ray radiation, or ultraviolet radiation.

6. The method of claim 1, wherein the developing solution includes an alkaline solution.

7. The method of claim 6, wherein said alkaline solution is TMAH.

8. The method of claim 1, wherein the photo-sensitive layer is formed of photo-sensitive resin.

9. The method of claim 8, wherein the photo-sensitive resin is selected from the group consisting of photo-sensitive acrylic resin, photo-sensitive BCB, photo-sensitive PFCB and photo-sensitive polyimide.

10. The method of claim 1, wherein the thickness of the photo-sensitive layer is between approximately 0.1 and 8 μm.

11. The method of claim 1, wherein the thickness of the photo-insensitive layer is between approximately 0.1 and 8 μm.

12. The method of claim 1, wherein the thickness ratio of the photo-insensitive layers to the total thickness of the photo-sensitive layer and photo-insensitive layer is not more than approximately 50%.

13. The method of claim 1, wherein the dielectric constant of the photo-sensitive layer is between approximately 2.5 and 4.0.

14. The method of claim 1, wherein the dielectric constant of the photo-insensitive layer is between approximately 1.5 and 3.5.

15. The method of claim 1, wherein the combined dielectric constant of the photo-sensitive layer and the photo-insensitive layer is between approximately 1.5 and 3.5.

16. The method of claim 1, wherein said forming the photo-insensitive layer and said forming the photo-sensitive layer are performed consecutively.

17. The method of claim 1, further comprising, curing the photo-insensitive layer and the photo-sensitive layer at the same time.

18. The method of claim 17, further comprising:
   forming a transparent electrode layer overlying the resulting structure.

19. A method of manufacturing a liquid crystal display (LCD) device, comprising:
   forming a gate bus line over an insulating substrate;
   forming a gate insulator over the gate bus line;
   forming a drain electrode over the gate insulator;
   forming a photo-sensitive layer over a substrate;
   forming a photo-insensitive layer over the photo-sensitive layer;
   exposing a portion of the photo-sensitive layer via a photomask to a radiation source,
   contacting the portion of the photosensitive layer using a developing solution through the photo-insensitive layer to remove the portion of the photo-sensitive layer and an immediately overlying portion of the photo-insensitive layer;
   curing the photo-insensitive layer and the photo-sensitive layer at the same time; and
   forming a transparent electrode layer overlying the resulting structure.

20. The method of claim 19, wherein the transparent electrode layer includes indium tin oxide (ITO).

21. The method of claim 20, the insulating substrate is formed of transparent material.

22. The method of claim 19, wherein photo-insensitive layer is formed of photo-insensitive resin.

23. The method of claim 21, wherein the photo-insensitive resin is selected from the group consisting of photo-insensitive PFCB, photo-insensitive BCB, photo-insensitive polyimide and photo-insensitive SOG.

24. The method of claim 18, wherein the developing solution comprises an alkaline solution.

25. The method of claim 24, wherein said alkaline solution is TMAH.

26. The method of claim 18, wherein the photo-sensitive layer is formed of photo-sensitive resin.

27. The method of claim 26, wherein the photo-sensitive resin is one selected from the group consisting of photo-sensitive acrylic resin, photo-sensitive BCB, photo-sensitive PFCB and photo-sensitive polyimide.

28. The method of claim 19, wherein the thickness of the photo-sensitive layer is between approximately 0.1 and 8 μm and the thickness of the photo-insensitive layer is between approximately 0.1 and 8 μm.

29. The method of claim 19, wherein the thickness ratio of the photo-insensitive layers to the total thickness of the photo-sensitive layer and photo-insensitive layer is not more than approximately 50%.

30. The method of claim 19, wherein the dielectric constant of the photo-sensitive layer is between approximately 2.5 and 4.0.

31. The method of claim 19, wherein the dielectric constant of the photo-insensitive layer is between approximately 1.5 and 3.5.

32. The method of claim 19, wherein the combined dielectric constant of the photo-sensitive layer and the photo-insensitive layer is between approximately 1.5 and 3.5.

33. The method of claim 19, wherein the photosensitive layer has a thickness of approximately 1.5 μm and photo-insensitive layer has a thickness of approximately 1.5 μm.

34. The method of claim 1, wherein the developing solution reaches the underlying photosensitive layer through the photo-insensitive layer.

* * * * *